US010868650B2

(12) United States Patent
Jiang et al.

(10) Patent No.: US 10,868,650 B2
(45) Date of Patent: Dec. 15, 2020

(54) PILOT RECONFIGURATION AND RETRANSMISSION IN WIRELESS NETWORKS

(71) Applicant: QUALCOMM Incorporated, San Diego, CA (US)

(72) Inventors: Jing Jiang, San Diego, CA (US); Joseph Binamira Soriaga, San Diego, CA (US); Tingfang Ji, San Diego, CA (US); Naga Bhushan, San Diego, CA (US); Krishna Kiran Mukkavilli, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 15/161,596

(22) Filed: May 23, 2016

(65) Prior Publication Data

US 2016/0352481 A1 Dec. 1, 2016

Related U.S. Application Data

(60) Provisional application No. 62/167,011, filed on May 27, 2015.

(51) Int. Cl.
*H04L 5/00* (2006.01)
*H04W 72/04* (2009.01)

(52) U.S. Cl.
CPC .......... *H04L 5/0048* (2013.01); *H04L 5/0044* (2013.01); *H04L 5/0053* (2013.01); *H04W 72/0446* (2013.01); *H04L 5/0091* (2013.01)

(58) Field of Classification Search
None
See application file for complete search history.

(56) References Cited

U.S. PATENT DOCUMENTS 7,853,262 B2 * 12/2010 Cheon .................... H04L 47/10
370/310
8,126,066 B2 * 2/2012 Osseiran ............. H04L 25/0224
375/259

(Continued)

FOREIGN PATENT DOCUMENTS

CN 101193054 A 6/2008
CN 103533655 A 1/2014

(Continued)

OTHER PUBLICATIONS

International Search Report and Written Opinion—PCT/US2016/033947—ISA/EPO—dated Dec. 15, 2016.

(Continued)

*Primary Examiner* — Gregory B Sefcheck
*Assistant Examiner* — Suk Jin Kang
(74) *Attorney, Agent, or Firm* — Haynes and Boone, LLP

(57) ABSTRACT

Adaptive signaling (e.g., pilot signaling, control signaling, or data signaling) is disclosed in which resources allocated to one or more symbols are allowed to vary to more closely match channel conditions and data latency requirements. In one embodiment, a method includes determining that low-latency data is available to transmit during a first transmission time interval (TTI) and informing a mobile station that the low-latency data will be transmitted during one slot reserved for a symbol in the first TTI. The low-latency data may be transmitted during the first time slot in the first TTI and the symbol (originally scheduled symbols) may be transmitted during a second time slot.

30 Claims, 16 Drawing Sheets

(56) References Cited

U.S. PATENT DOCUMENTS

| | | | | |
|---|---|---|---|---|
| 8,483,151 | B2* | 7/2013 | Youn | H04W 72/10 370/259 |
| 9,444,589 | B2 | 9/2016 | Bhattad et al. | |
| 2003/0152052 | A1* | 8/2003 | Kekki | H04Q 11/0478 370/335 |
| 2004/0223552 | A1* | 11/2004 | McDonough | H04L 1/0052 375/242 |
| 2006/0165128 | A1* | 7/2006 | Peake | H04B 1/76 370/503 |
| 2006/0262871 | A1* | 11/2006 | Cho | H04L 5/0044 375/260 |
| 2007/0070944 | A1* | 3/2007 | Rinne | H04B 7/0669 370/329 |
| 2008/0137761 | A1* | 6/2008 | Stadelmeier | H04L 5/0007 375/260 |
| 2008/0205451 | A1* | 8/2008 | Ramesh | H04L 5/0007 370/491 |
| 2008/0232240 | A1* | 9/2008 | Baum | H04L 5/0007 370/210 |
| 2009/0067522 | A1* | 3/2009 | Kwak | H04L 5/0048 375/260 |
| 2009/0245412 | A1* | 10/2009 | Cho | H04L 5/0044 375/267 |
| 2009/0257516 | A1* | 10/2009 | Hsieh | H04L 5/0051 375/260 |
| 2009/0279623 | A1* | 11/2009 | Wu | H04L 5/0023 375/260 |
| 2009/0303937 | A1* | 12/2009 | Sawahashi | H04L 5/0064 370/329 |
| 2010/0034076 | A1* | 2/2010 | Kishiyama | H04J 11/005 370/210 |
| 2010/0061472 | A1* | 3/2010 | Molnar | H04B 7/0417 375/260 |
| 2010/0195580 | A1* | 8/2010 | Samarasooriya | H04W 16/14 370/329 |
| 2012/0076101 | A1* | 3/2012 | Kojima | H04L 5/0048 370/329 |
| 2012/0155425 | A1* | 6/2012 | Budianu | H04L 5/0048 370/330 |
| 2012/0188946 | A1* | 7/2012 | Ma | H04B 7/2621 370/328 |
| 2012/0213233 | A1* | 8/2012 | Stadelmeier | H04L 5/0005 370/474 |
| 2013/0003694 | A1* | 1/2013 | Choi | H04W 48/08 370/330 |
| 2013/0107694 | A1* | 5/2013 | Hu | H04J 13/0003 370/203 |
| 2013/0279627 | A1* | 10/2013 | Wu | H04L 5/0023 375/295 |
| 2014/0016715 | A1* | 1/2014 | Stadelmeier | H04L 5/0007 375/260 |
| 2014/0029428 | A1* | 1/2014 | Lin | H04L 5/0048 370/235 |
| 2014/0071954 | A1* | 3/2014 | Au | H04W 72/0446 370/336 |
| 2014/0079152 | A1* | 3/2014 | Ma | H04L 25/0226 375/295 |
| 2015/0003567 | A1* | 1/2015 | Stadelmeier | H04L 5/0007 375/308 |
| 2015/0156769 | A1* | 6/2015 | Mazzarese | H04W 72/0413 370/329 |
| 2016/0127094 | A1* | 5/2016 | Jiang | H04L 5/0048 370/252 |
| 2016/0156451 | A1* | 6/2016 | Ma | H04L 5/0046 370/330 |
| 2016/0197707 | A1* | 7/2016 | Stadelmeier | H04H 60/07 370/474 |
| 2016/0233998 | A1* | 8/2016 | Sun | H04L 5/0051 |
| 2016/0234857 | A1* | 8/2016 | Chen | H04W 72/1231 |
| 2016/0323887 | A1* | 11/2016 | Patel | H04W 52/365 |
| 2017/0222702 | A1* | 8/2017 | Tong | H04B 7/0617 |

FOREIGN PATENT DOCUMENTS

| | | |
|---|---|---|
| WO | WO-2007024027 A1 | 3/2007 |
| WO | 2011044172 A2 | 4/2011 |
| WO | WO-2011098427 A2 | 8/2011 |
| WO | 2013046375 A1 | 4/2013 |
| WO | WO-2015058005 A2 | 4/2015 |

OTHER PUBLICATIONS

Partial International Search Report—PCT/US2016/033947—ISA/EPO—dated Sep. 14, 2016.

3GPP TR 22.891 V0.1.1, 3rd Generation Partnership Project; Technical Specification Group Services and System Aspects; Feasibility Study on New Services and Markets Technology Enablers; Stage 1 (Release 14) [online], 3GPP TSG-SA WG1 #70, S1-151623, Apr. 2015, 25 Pages, Retrieved from the Internet URL: http://www.3gpp.org/ftp/tsg_sa/WG1_Serv/TSGS1_70_Los_CAbos/Docs/S1-151623.zip.

Motorola Mobility: "Using Shortened DL TTI for Reduced Latency Data Transmission," 3GPP Draft; 3GPP TSG RAN WG1 #84, R1-160971_Shortened_TTI_V0, 3rd Generation Partnership Project (3GPP), Mobile Competence Centre; 650, Route Des Lucioles; F-06921 Sophia-Antipolis Cedex; France, vol. RAN WG1, No. St. Julian's, Malta; Feb. 15, 2016-Feb. 19, 2016 Feb. 14, 2016 (Feb. 14, 2016), XP051054278, pp. 1-3, Retrieved from the Internet: URL:http://www.3gpp.org/ftp/Meetings_3GPP_SYNC/RAN1/Docs/ [retrieved on Feb. 14, 2016], 3 pages.

Nokia, Alcatel-Lucent Shanghai Bell: "Punctured Scheduling for Low Latency Transmissions" [online], 3GPP TSG-RAN WG1 #85, R1-165381, May 23, 2016, Retrieved from the Internet URL: http://www.3gpp.org/ftp/tsg_ran/WG1_RL1/TSGR1_1485/Docs/R1-165381.zip.

Qualcomm: "5G Views on Technology & Standardization", 3GPP Draft, RWS-150012, QCOM-5G, 3GPP workshop Sep. 17, 2015_18_RAN_5G, 3rd Generation Partnership Project (3GPP), Mobile Competence Centre, 650, Route Des Lucioles, F-06921, Sophia, Antipolis Cedex, France, Sep. 2, 2015 (Sep. 2, 2015), 21 Pages, XP051043597, Retrieved from the Internet: URL: http://www.3gpp.org/ftp/workshop/2015-09-17_18_RAN_5G/Docs/RWS-150012.zip.

Samsung: "eMBB and URLLC Multiplexing in DL", 3GPP TSG RAN WG1 Meeting #87, R1-1612540, Reno, USA, Nov. 14-18, 2016, pp. 1-5, Retrieved from the Internet URL: http://www.3gpp.org/ftp/tsg_ran/WG1_RL1/TSGR1_87/Docs/R1-1612540.zip.

* cited by examiner

PILOT RECONFIGURATION AND RETRANSMISSION IN WIRELESS NETWORKS

CROSS REFERENCE TO RELATED APPLICATIONS

The present application claims priority to and the benefit of the U.S. Provisional Patent Application No. 62/167,011, filed May 27, 2015, which is hereby incorporated by reference in its entirety.

TECHNICAL FIELD

This application relates to wireless communication systems, and more particularly to adaptive signaling and flexible frame formats and network protocols for accommodating changes in signal structure and/or scheduling of transmissions.

INTRODUCTION

To achieve sufficient performance in wireless communication systems, it is sometimes useful to characterize the wireless channel. For example, a transmitting entity may need an estimate of one or more channel parameters to perform spatial processing, precoding, or adaptive modulation and coding in order to transmit data to a receiving entity. The receiving entity may need an estimate of one or more channel parameters to properly demodulate transmitted signals in order to recover transmitted data.

Pilots may be inserted in a transmitted data stream to assist a receiving entity with various functions, including not only channel estimation but also timing and frequency offset acquisition as examples. A pilot typically includes one or more modulation symbols known to both the transmitting entity and the receiving entity that are transmitted in a known manner.

Conventional systems employ a fixed pilot structure that provides an adequate number and distribution of pilot symbols for most receiving entities under most channel conditions. However, the pilot structures may be inadequate for challenging channel conditions, and the pilot structures may waste system resources during more benign channel conditions. Thus, there is a need for techniques to better match pilot structures to channel conditions.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one embodiment, the present disclosure provides a method for wireless communication, the method including determining at a first wireless communication device, that low-latency data is available, transmitting, from the first wireless communication device, the low-latency data during a first symbol period of a first transmission time interval (TTI), wherein at least one of a pilot symbol or a control symbol is scheduled to be transmitted during the first symbol period, and transmitting, from the first wireless communication device, the at least one pilot symbol or control symbol during a second symbol period of the first TTI, wherein a data symbol is scheduled to be transmitted during the second symbol period.

In another embodiment, the present disclosure provides a method of wireless communication, the method including determining, at a first wireless communication device, that low-latency data is available for transmission during a first transmission time interval (TTI), transmitting, from the first wireless communication device, the low-latency data during a first symbol period of a first transmission time interval (TTI), wherein at least one of a pilot symbol or a control symbol is scheduled to be transmitted during the first symbol period, identifying, at the first wireless communication device, a second symbol period for transmission of the at least one pilot symbol or control symbol, wherein a data symbol is scheduled for transmission during the second symbol period, and transmitting, from the first wireless communication device, a notification message that the at least one pilot symbol or control symbol will be transmitted during the second symbol period.

In further embodiments, the present disclosure provides a method for wireless communication, the method including determining, at a first wireless communication device, that low-latency data is available for transmission, transmitting, from the first wireless communication device, the low-latency data during a first symbol period of a first transmission time interval (TTI), wherein at least one of a pilot symbol or a control symbol is scheduled to be transmitted during the first symbol period, transmitting, from the first wireless communication device, the at least one pilot symbol or control symbol during a second symbol period of the first TTI, wherein a data symbol having one or more code blocks is scheduled to be transmitted during the second symbol period, transmitting, from the first wireless communication device, a first subset of the one or more code blocks of the data symbol during a second symbol period in the first TTI, and transmitting, from the first wireless communication device, a second subset of the one or more code blocks of the data symbol during a symbol period subsequent to the second symbol period of the first TTI.

In further embodiments, the present disclosure provides a wireless communication device including a transmitter, an electronic memory, and a processor coupled to the transmitter and to the electronic memory. The processor determines that low-latency data is available for transmission, transmits the low-latency data during a first symbol period of a first transmission time interval (TTI), wherein a pilot symbol and/or a control symbol is scheduled to be transmitted during the first symbol period, and transmits the pilot symbol and/or control symbol during a second symbol period of the first TTI, wherein a data symbol is scheduled to be transmitted during the second symbol period.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

This disclosure relates generally to adaptive signaling (e.g., pilot signaling, control signaling or data signaling) and flexible frame formats and network protocols for accommodating changes in signal structure and/or scheduling. Adaptive techniques are disclosed herein that attempt to tune a number of pilot symbols and the distribution thereof over time and frequency resources to channel conditions in an effort to minimize system overhead while at the same time providing enough pilot symbols for receivers to function sufficiently.

Figure 1:
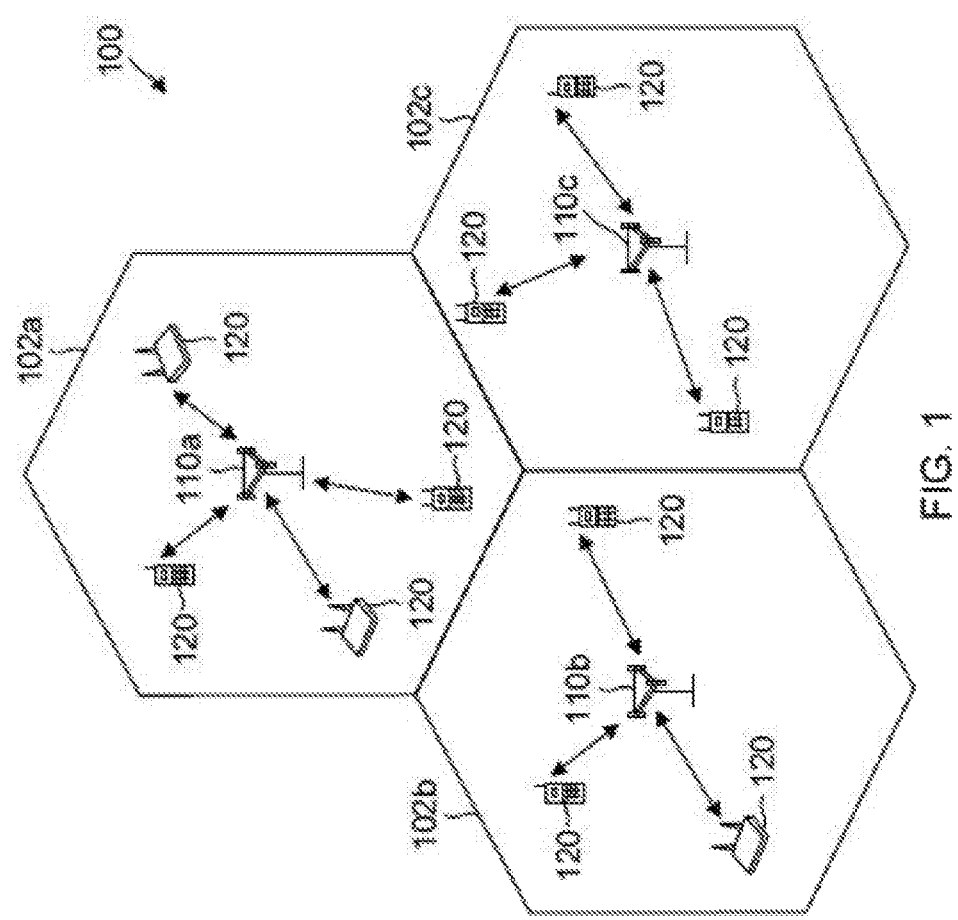
FIG. 1 illustrates a wireless communication network in accordance with various aspects of the present disclosure.

FIG. 1 illustrates a wireless communication network 100, in accordance with various aspects of the disclosure. The wireless network 100 may include a number of base stations 110. A base station 110 may include an evolved Node B (eNodeB) in the LTE context, for example. A base station may also be referred to as a base transceiver station or an access point.

The base stations 110 communicate with user equipments (UEs) 120 as shown. A UE 120 may communicate with a base station 110 via an uplink and a downlink. The downlink (or forward link) refers to the communication link from a base station 110 to a UE 120. The uplink (or reverse link) refers to the communication link from a UE 120 to a base station 110.

The UEs 120 may be dispersed throughout the wireless network 100, and each UE 120 may be stationary or mobile. A UE may also be referred to as a terminal, a mobile station, a subscriber unit, etc. A UE 120 may be a cellular phone, a smartphone, a personal digital assistant, a wireless modem, a laptop computer, a tablet computer, etc. The wireless communication network 100 is one example of a network to which various aspects of the disclosure apply.

This disclosure is directed to any type of modulation scheme, but orthogonal frequency division multiplexing (OFDM) is used as a representative modulation. OFDM is a multi-carrier modulation technique that effectively partitions the overall system bandwidth into multiple (K) orthogonal frequency subbands. These subbands may also be referred to as tones, subcarriers, bins, and frequency channels. With OFDM, each subband is associated with a respective subcarrier that may be modulated with data. Up to K modulation symbols may be sent on the K subbands in each OFDM symbol period.

A pilot, control, or data symbol may be a symbol known to both the transmitter and receiver and transmitted in a subband. For an OFDM symbol with K subbands, any number and configuration of subbands may be used for pilot symbols, control symbols, and/or data symbols. For example, half of the subbands may be used for pilot symbols, and the remaining subbands may be used for other purposes, such as to transmit data symbols or control symbols or the remaining subbands may not be used at all.

The transmission and signaling techniques described herein may be used for a single-input single-output (SISO) system, a single-input multiple-output (SIMO) system, a multiple-input single-output (MISO) system, and a multiple-input multiple-output (MIMO) system. These techniques may be used for an OFDM-based system and for other multi-carrier communication systems. These techniques may also be used with various OFDM subband structures.

Figure 2:
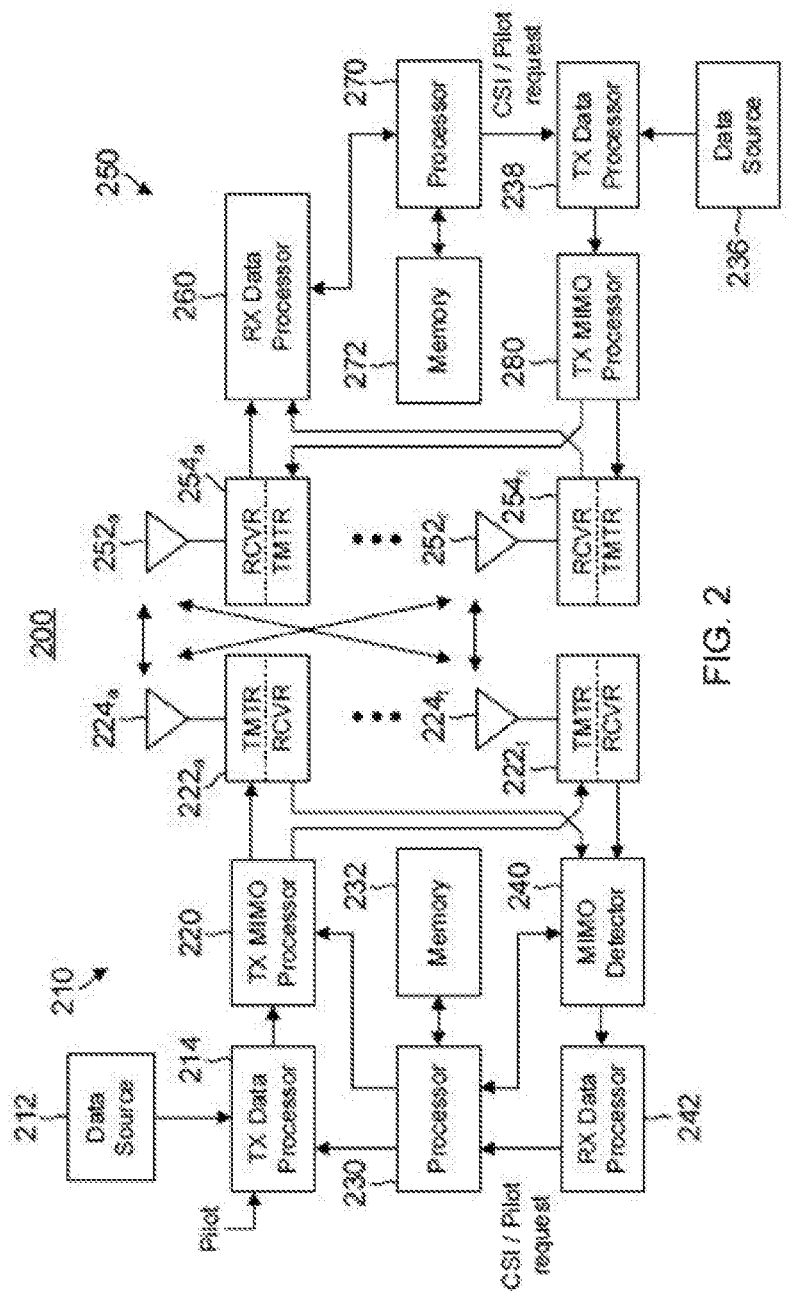
FIG. 2 is a block diagram illustrating an exemplary transmitter system in accordance with various aspects of the present disclosure.

FIG. 2 is a block diagram illustrating an exemplary transmitter system 210 (e.g., a base station 110) and a receiver system 250 (e.g., a UE 120) in a MIMO system 200, according to certain aspects of the present disclosure. At the transmitter system 210, traffic data for a number of data streams is provided from a data source 212 to a transmit (TX) data processor 214.

In a downlink transmission, for example, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data and control data using OFDM techniques. The pilot and control data are typically a known data pattern that is processed in a known manner and may be used at the receiver system to estimate the channel response or other channel parameters. Pilot data may be formatted into pilot symbols. The number of pilot symbols and placement of pilot symbols within an OFDM symbol may be determined by instructions performed by processor 230. Similarly, control data may be formatted into control symbols. The number of control symbols and placement of control symbols within an OFDM symbol may be determined by instructions performed by processor 230.

The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. The number of pilot symbols and placement of the pilot symbols in each frame may also be determined by instructions performed by processor 230. Similarly, the number of control symbols and placement of the control symbols in each frame may also be determined by instructions performed by processor 230. Similarly, the number of data symbols and placement of the data symbols in each frame may also be determined by instructions performed by processor 230.

The processor 230 may be implemented using a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 230 may also be implemented as a combination of computing devices, e.g., a combination of a DSP and a microprocessor, a plurality of microprocessors, one or more microprocessors in conjunction with a DSP core, or any other such configuration.

The transmitter system 210 further includes a memory 232. The memory 232 may be any electronic component capable of storing information and/or instructions. For example, the memory 250 may include random access memory (RAM), read-only memory (ROM), flash memory devices in RAM, optical storage media, erasable programmable read-only memory (EPROM), registers, or combinations thereof. In an embodiment, the memory 232 includes a non-transitory computer-readable medium.

Instructions or code may be stored in the memory 232 that are executable by the processor 230. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The modulation symbols for all data streams are then provided to a TX MIMO processor 220, that may further process the modulation symbols (e.g., for OFDM). TX MIMO processor 220 then provides $N_T$ modulation symbol streams to $N_T$ transmitters (TMTR) $222_a$ through $222_t$. In some embodiments, TX MIMO processor 220 applies beamforming weights to the symbols of the data streams and to the antenna from which the symbol is being transmitted. The transmitter system 210 includes embodiments having only one antenna or having multiple antennas.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas $224_a$ through $224_t$, respectively. The techniques described herein apply also to systems with only one transmit antenna. Transmission using one antenna is simpler than the multi-antenna scenario. For example, there may be no need for TX MIMO processor 220 in a single antenna scenario.

At receiver system 250, the transmitted modulated signals are received by $N_R$ antennas $252_a$ through $252_r$ and the received signal from each antenna 252 is provided to a respective receiver (RCVR) $254_a$ through $254_r$. Each receiver 254 conditions (e.g., filters, amplifies, and downconverts) a respective received signal, digitizes the conditioned signal to provide samples, and further processes the samples to provide a corresponding "received" symbol stream. The techniques described herein also apply to embodiments of receiver system 250 having only one antenna 252.

An RX data processor 260 then receives and processes the $N_R$ received symbol streams from NR receivers 254 based on a particular receiver processing technique to provide $N_T$ detected symbol streams. The RX data processor 260 then demodulates, deinterleaves, and decodes as necessary each detected symbol stream to recover the traffic data for the data stream. The processing by RX data processor 260 is complementary to that performed by TX MIMO processor 220 and TX data processor 214 at transmitter system 210.

Information provided by the RX data processor 260 allows the processor 270 to generate reports such as channel state information (CSI) and/or a pilot request to provide to the TX Data Processor 238. Processor 270 formulates a reverse link message including the CSI and/or pilot request to transmit to the transmitter system.

The processor 270 may be implemented using a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 270 may also be implemented as a combination of computing devices, e.g., a combination of a DSP and a microprocessor, a plurality of microprocessors, one or more microprocessors in conjunction with a DSP core, or any other such configuration.

The reverse link message may include various types of information regarding the communication link and/or the received data stream. The reverse link message is then processed by a TX data processor 238, which also receives traffic data for a number of data streams from a data source 236, modulated by a TX MIMO processor 280, conditioned by transmitters 254$_a$ through 254$_r$, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines a symbol density and placement based on information in the reverse link message. The symbol may be a pilot symbol, control symbol, or data symbol. Although the following examples may describe the symbol as a pilot symbol, this is not intended to be limiting and it should be understood that the symbol may be a control symbol or data symbol. An example of pilot symbol density is the number of pilot symbols per unit time or per unit frequency as discussed more fully below. An example pilot structure is a combination of pilot density and placement.

Figure 3A:
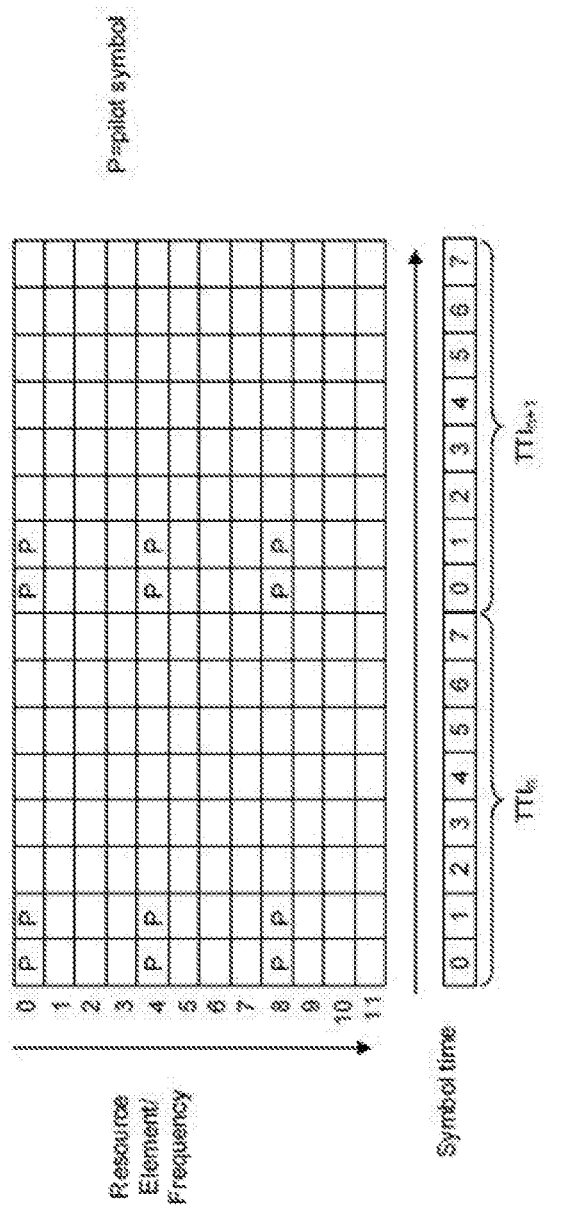
FIGS. 3A-3C illustrate downlink frame structures used in a wireless communication network in accordance with various aspects of the present disclosure.
Figure 3B:
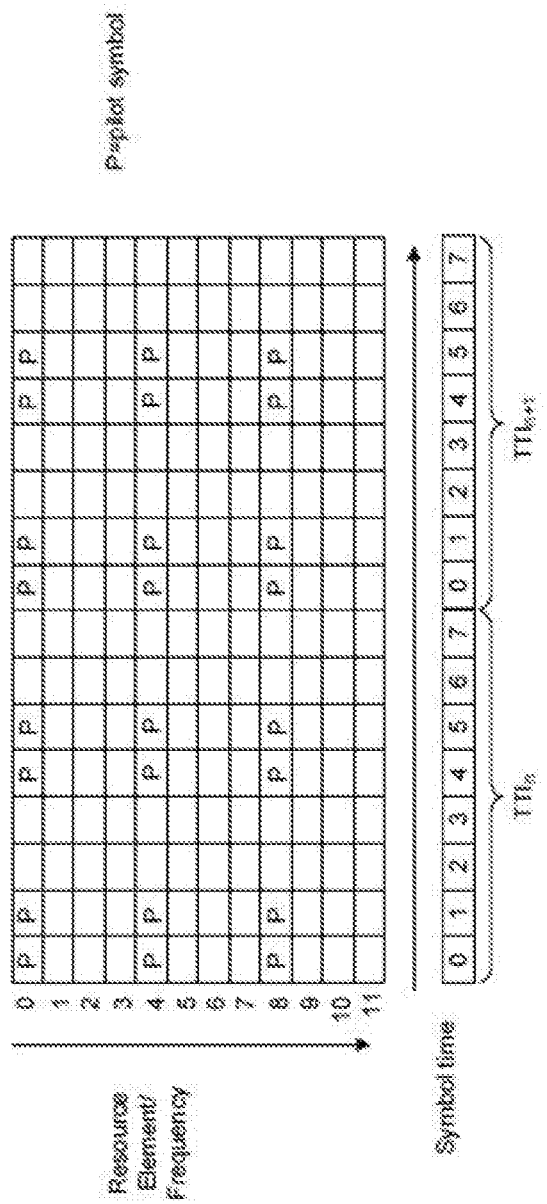
Figure 3C:
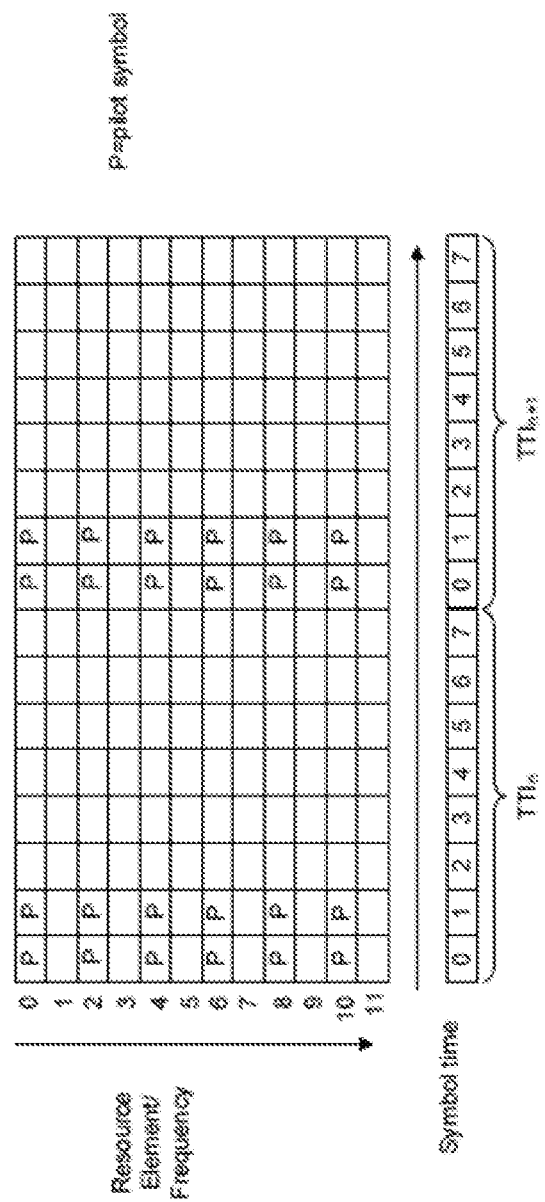

FIGS. 3A-3C illustrate downlink frame structures used in a wireless communication network (e.g., the wireless communication network shown in FIG. 1), in accordance with various aspects of the present disclosure. The transmission timeline for the downlink may be partitioned into units of transmission time intervals (TTIs). A TTI may be related to the size of the data blocks passed from the higher network layers to the radio link layer. In some embodiments, the duration of symbols, such as OFDM symbols, is fixed, and there are a predetermined number of symbol periods during each TTI. For example, each TTI may be any number of symbol periods, such as 8, 10, or 12 symbol periods, as examples. In the embodiments in FIGS. 3A-3C, each TTI includes eight OFDM symbol periods, and the symbol periods are assigned indices 0 through 7 as shown. A transmission during a TTI may be referred to as a frame, a subframe, or a data block. An OFDM symbol period is an example time slot.

A number of resource elements may be available in each OFDM symbol period. Each resource element may cover one subcarrier in one symbol period and may be used to send one modulation symbol, which may be a real or complex value.

FIGS. 3A-3C illustrate three examples of signals transmitted using the illustrated frame structures. In particular, the examples in FIGS. 3A-3C illustrate various pilot structures. In each of FIGS. 3A-3C, there are 11 resource elements per OFDM symbol as an illustrative example. The resource elements are assigned indices 0 through 11 as shown. Pilot symbols are transmitted in the designated resource elements and are denoted by "P." The remaining resource elements are available for other types of symbols, such as data symbols, or control symbols, or are simply unused or muted.

The pilot structures in FIGS. 3A-3C may represent a signal format transmitted from an antenna. The pilot structures may apply regardless of the number of antennas employed in the transmitting entity or the receiving entity. For example, in a SISO system, the signal is transmitted from the transmitting antenna and received at the receive antenna. As another example, in a MIMO system, the illustrated frame structures are transmitted from at least one antenna. Each antenna from among a plurality of antennas may transmit the same or a different pilot structure. In one embodiment, the illustrated pilot structure will be received by a receive antenna, and may be part of a composite signal that is a sum of signals from a plurality of antennas.

FIG. 3A illustrates a baseline pilot structure. Pilot symbols are transmitted in OFDM symbol periods 0 and 1 in each TTI. Within periods 0 and 1, pilot symbols are transmitted in resource elements 0, 4 and 8. In some embodiments, the pilot symbols may be transmitted to a specific UE. In other embodiments, the pilot symbols may be transmitted to a group of UEs. In some other embodiments, the pilot symbols may be cell-specific reference signals. The pilot symbols may be used for channel estimation for coherent demodulation of the physical channel.

FIG. 3B illustrates one technique to double the pilot density as compared to FIG. 3A. In FIG. 3B, the pilot density is doubled by doubling the number of OFDM symbols within a TTI that contains pilot symbols. More specifically, pilot symbols are transmitted in the 4th and $5^{th}$ periods within a TTI, in addition to the $0^{th}$ and $1^{st}$ periods. In essence, the number of pilot symbols is doubled by increasing the duty cycle or time density of pilot symbols. FIG. 3B represents but one example of many ways to double the duty cycle. For example, pilot symbols could be transmitted instead in the $1^{st}$ through $4^{th}$ symbol positions or any other combination of four symbol positions.

FIG. 3C illustrates another technique to double the pilot density as compared to FIG. 3A. In FIG. 3C, the pilot density is doubled by doubling the frequency occupancy as compared to FIG. 3A. More specifically, there are pilot symbols in resource elements 0, 2, 4, 6, 8, and 10 in the $0^{th}$ and $1^{st}$ OFDM symbol periods in each TTI. In essence, the number of pilot symbols is doubled by increasing the density versus frequency within the symbol positions. FIG. 3C represents but one example of many ways to double the frequency density as compared to FIG. 3A. For example, pilot symbols could be transmitted in the $1^{st}$ through $6^{th}$ resource elements or any other combination of six resource elements.

There are situations in which it would be advantageous to vary the frequency density of pilots as opposed to time density of pilots and vice versa. FIG. 3A represents a pilot structure that is advantageous for channels with relatively low Doppler spread and relatively low channel delay-spread. Time variation of a channel is related to Doppler spread of the channel. Doppler spread may be caused, for example, by the differences in Doppler shifts of different components of a signal, if either the transmitter or receiver is in motion. As Doppler spread increases, it is advantageous to increase the time density of pilot symbols. One reason is because the higher the Doppler spread, the faster a channel estimate becomes outdated. Increasing time density or duty cycle of pilot symbols allows a channel estimate to be updated more frequently, which is beneficial for higher delay spreads.

Frequency variation of a channel is related to delay spread of the channel. As delay spread increases, it is advantageous to increase the frequency density of pilot symbols. This is because increases in delay spread result in increases in frequency selectivity of a channel. Increasing frequency density of pilot symbols allows channel estimates to better capture frequency selectivity caused by increased delay spread.

It may also be advantageous to vary pilot density on the basis of other parameters, such as signal-to-noise ratio (SNR) estimates, signal-to-interference-plus-noise (SINR) estimates, or interference estimates. For example, for increasing noise or interference values (or decreasing SNR or SINR), increasing numbers of pilot symbols are useful.

Techniques can be used to estimate Doppler spread, delay spread, SNR, SINR, and interference in UEs. Any one of these techniques can be used to estimate these channel parameters, and these channel parameters are examples of CSI. One or more of these parameters can be used to select a downlink pilot structure. The selection of pilot structure can be made either in the UE or the base station. If the decision is to be made in the base station, channel parameter estimates can be fed back to the base station to allow the base station to make the decision on pilot structure. If the decision on pilot structure is to be made in the UE, a request for the determined pilot structure can be transmitted to the base station.

FIGS. 4A-4D illustrate example frame structures to accommodate as needed transmission of low-latency data. A frame may be transmitted in a TTI. The structure illustrated in $TTI_n$ represents an example baseline frame structure. The frames in FIGS. 4A-4D may be transmitted from a base station, such as base station 110, to a UE, such as UE 120 or vice versa. The symbols in FIGS. 4A-4D marked "data" may represent symbols transmitted as part of an on-going data session between a UE and a base station. The baseline frame structure in this example is one in which an OFDM symbol containing pilot and/or control symbols is transmitted in an alternating manner with data symbols. In $TTI_n$, an OFDM symbol containing pilot and control symbols (labeled as "pilot" and "control") is transmitted at symbol index 0, and an OFDM symbol containing a pilot symbol is transmitted at symbol index 4.

Figure 4A:
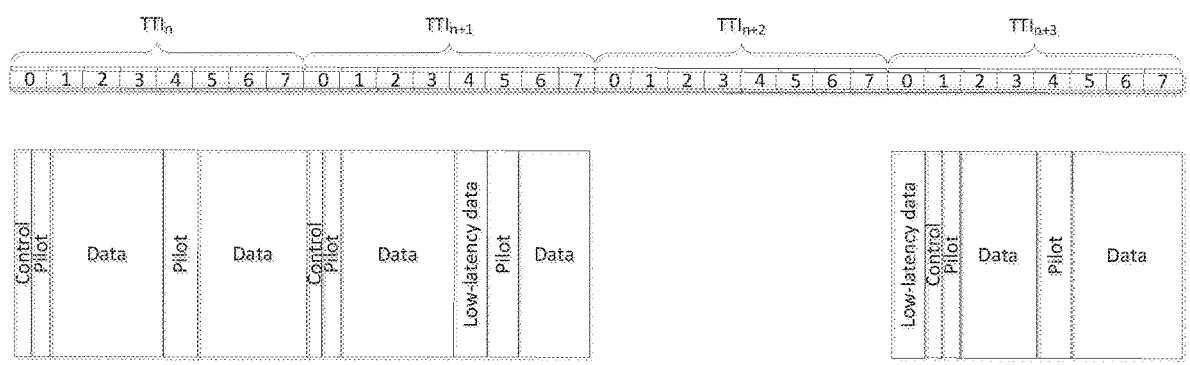
FIGS. 4A-4D illustrate frame structures to accommodate as needed transmission of low-latency data in accordance with various aspects of the present disclosure.
Figure 4B:
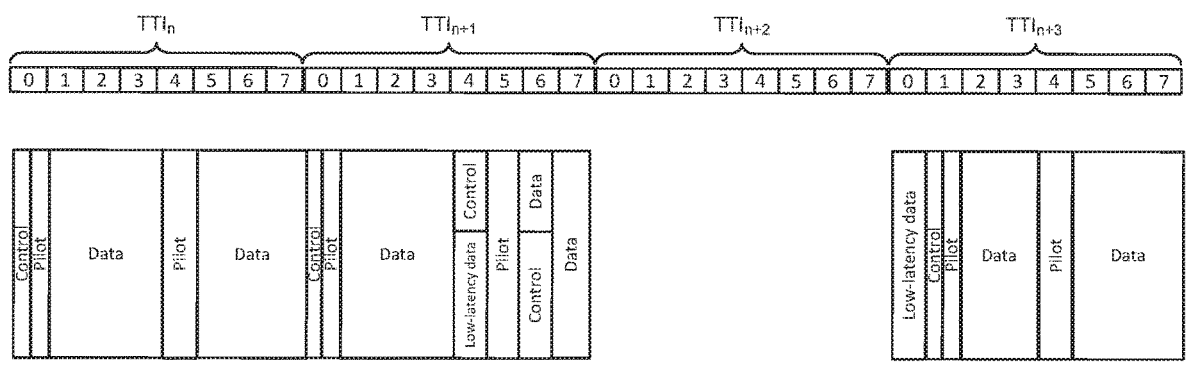

In $TTI_{n+1}$, low-latency data is available. In effect, low-latency data "trumps" or supersedes any data scheduled to be transmitted as part of the on-going data session. The data in the on-going session is relatively delay tolerant compared to the "low-latency" data. In the example illustrated in FIG. 4A, the punctured data includes pilot and control symbols. In some embodiments, the base station (e.g., base station 110a) determines that low-latency data is available to transmit during a TTI (e.g., $TTI_{n+1}$). In some examples, based on the determination that low-latency data is available to transmit during $TTI_{n+i}$, the base station informs a mobile station (e.g., UE 120) that the low-latency data will be transmitted during a time slot (e.g., OFDM symbol period 4 in $TTI_{n+1}$) reserved for one or more symbols (e.g., pilot symbol) in $TTI_{n+1}$. The one or more symbols may be "pierced" or "punctured," and the base station may transmit the low-latency data during the time slot that was originally reserved for the one or more symbols and transmit the one or more symbols during a subsequent time slot. For example, as shown in FIG. 4B, when the low latency data punctures the control symbol (in $TTI_{n+1}$), the punctured portion of the control symbol is transmitted during a subsequent time slot by puncturing the payload data. In various embodiments, the low-latency data may "puncture" the one or more symbols (pilot or control or data) over the entire frequency range, as showed in FIG. 4A, or over a sub-band within the entire frequency band, as shown in FIG. 4B. The subsequent time slot may be in the same TTI or a subsequent TTI.

Figure 4C:
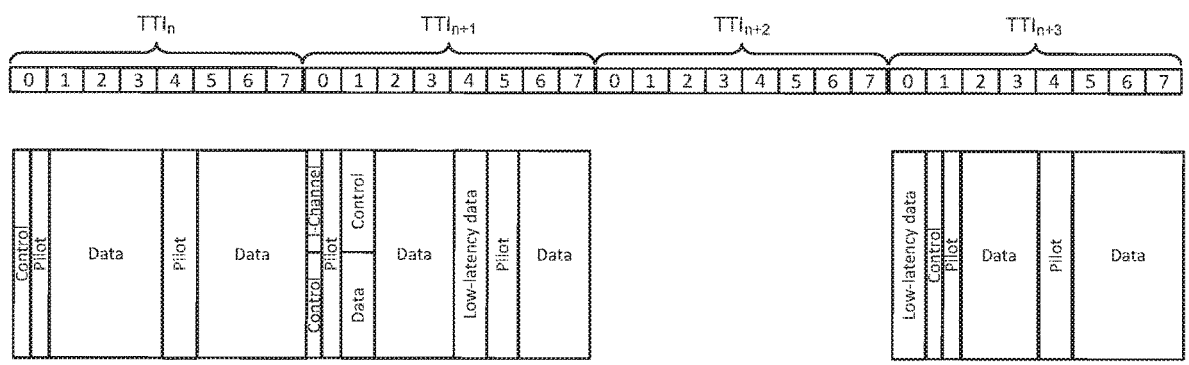
Figure 4D:
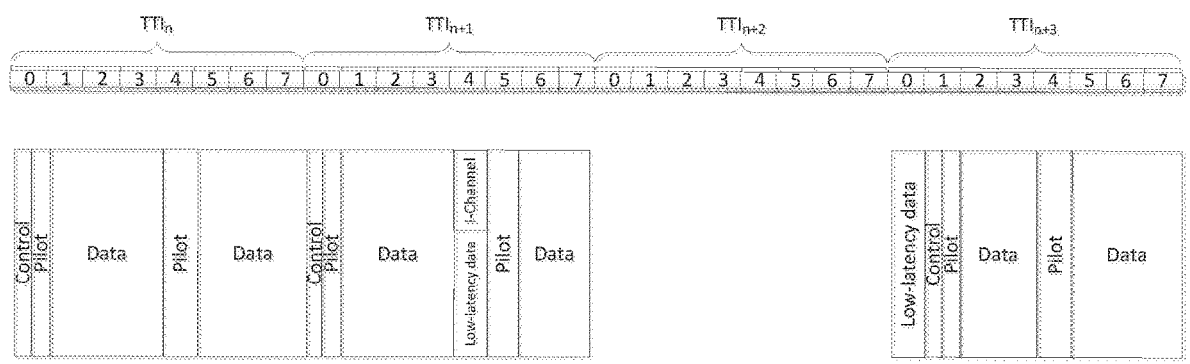

Upon determination that low-latency data is available for transmission, the base station may transmit information through an indicator channel (I-Channel) to inform one or more receiving UEs that low-latency is available for transmission. The indicator channel may be transmitted over the entire frequency range or over a sub-band within the entire frequency band, as shown in FIGS. 4C-D. The transmitted information may include details regarding a concurrent or later symbol or time slot during which the low-latency is being or will be transmitted. For example, as shown in FIG. 4C, the indicator channel (I-Channel) may be transmitted over a sub-band of the frequency during the $0^{th}$ symbol of $TTI_{n+1}$ along with the control channel. As discussed above, the indicator channel may include information that the low-latency data will later be transmitted during the $4^{th}$ symbol of $TTI_{n\pm i}$. Similarly, as shown in FIG. 4D, the indicator channel (I-Channel) may be transmitted over a sub-band of the frequency during the $4^{th}$ symbol of $TTI_{n+1}$. As discussed above, the indicator channel may include information that the low-latency data is concurrently being transmitted during the $4^{th}$ symbol of $TTI_{n+1}$.

In addition, the transmitted information may include details regarding the symbol or time slot during which the data punctured by the low-latency data will be transmitted. For example, as shown in FIG. 4C, the indicator channel may include information that the punctured control data will later be transmitted during the $1^{st}$ symbol of $TTI_{n+1}$. In this case, the control data will be sent by puncturing the payload data as discussed with respect to FIG. 4B. Although it is critical to indicate the transmission of low-latency data in the current or later symbol because low-latency data is more delay sensitive, it is also critical to inform the UE of the symbol period or time slot during which the punctured portion of the pilot or control data will be transmitted.

Before determining that the low-latency data is available to transmit during a first time slot, the symbol is initially scheduled for transmission during the first time slot. Based on determining that low-latency data is available to transmit during the first time slot, the symbol that is originally scheduled (in the absence of low-latency data) for transmission during the first time slot may be "punctured" and transmitted during a subsequent time slot. It should be also understood that low-latency traffic puncturing data/control in the figures are for illustration purposes. In general, puncturing may happen at any symbol such as, for example, at a data symbol.

As part of an example network protocol, there may be a separate control channel (illustrated in FIG. 5) that indicates to the UE that low-latency data is available. It is understood or implied that the next OFDM pilot will be punctured or moved from its standard position (in this case, OFDM symbol period 4 in $TTI_{n+1}$) to another OFDM symbol period (in this case, OFDM symbol period 5 in $TTI_{n+1}$). In general, the pilot may be moved any number of symbol periods later (e.g., two, three, etc. symbol periods later), as long as the UE is aware of the number of symbols that the pilot is moved. In various embodiments, the UE may be made aware of the number of symbol periods for which the pilot (or control or data) is moved via a notification message communicated over the control channel. Alternatively, the UE may be made aware of the symbol period during which the pilot (or control or data) will be transmitted via the notification message. OFDM symbol period 5 in $TTI_{n+1}$ is subsequent to OFDM symbol period 4 in $TTI_{n+1}$.

Figure 5:
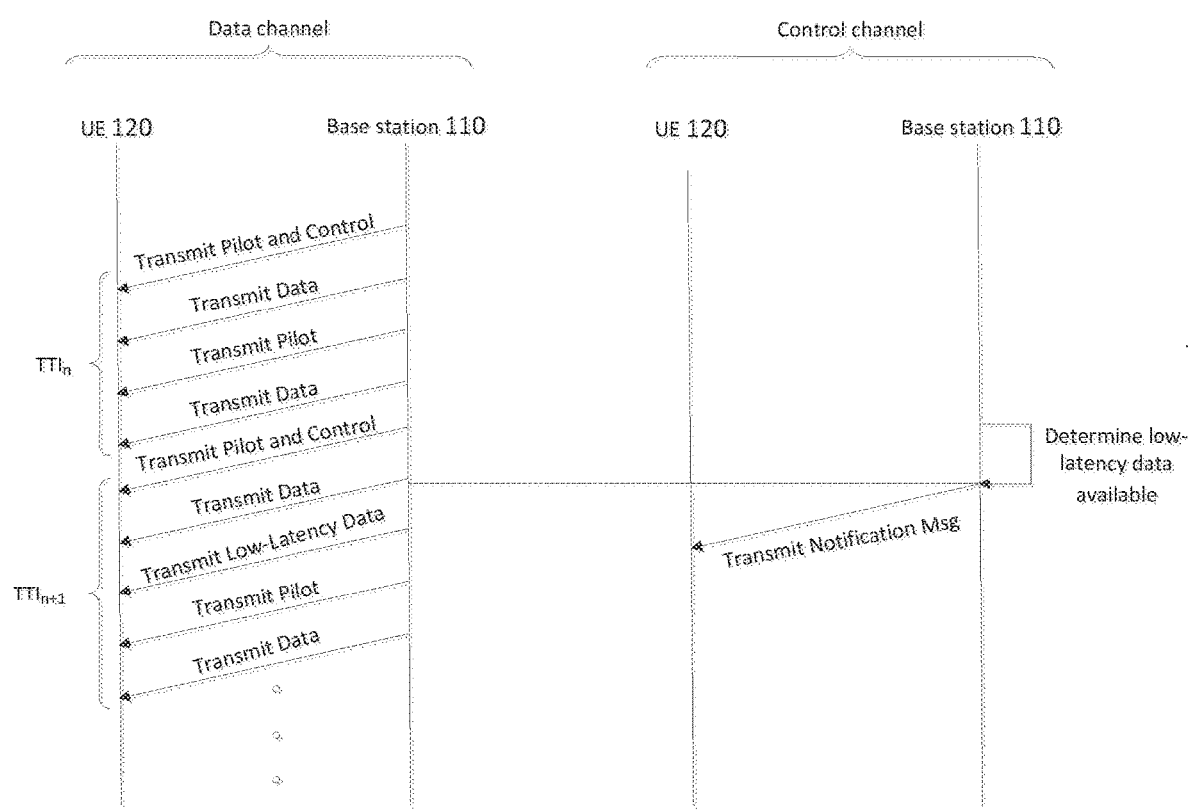
FIG. 5 is a protocol diagram that illustrates example transmissions during the first two TTIs of FIGS. 4A-4D between a base station and a UE in accordance with various aspects of the present disclosure.

FIG. 5 is a protocol diagram that illustrates example transmissions during the first two TTIs of FIG. 4 between a base station 110 and a UE 120. FIG. 5 illustrates a data channel that contains the transmissions of the first two TTIs of FIG. 4 as well as an associated control channel. When low-latency data is available, a transmit notification message is transmitted over the control channel from the base station 110 to UE 120 as shown. The notification message is transmitted shortly after the base station 110 becomes aware of the low-latency data, due at least in part to the delay intolerance of the low-latency data.

Returning to FIG. 4, in this example there is no data to transmit during $TTI_{n+2}$, so there is no transmission. During $TTI_{n+2}$, the base station becomes aware that more low-latency data is available. The UE is informed of the low-latency data via a control channel as discussed earlier. The low-latency data supersedes the pilot and control for the following TTI, $TTI_{n+3}$, so the pilot and control are moved from OFDM symbol period 0 to OFDM period 1 to make room for the low-latency data. The process of transmitting frames during TTIs and inserting low-latency data as needed may continue indefinitely.

In some instances, severe bursty interference occurs during a downlink transmission. Bursty interference can include interference that occurs in short spurts or time intervals over a short period of time. Bursty interference may appear for only a brief period of time to affect some signals but may not appear over such a sustained period of time that the system should adapt to the level of interference as a long-term statistic. One example of bursty interference is a non-persistent burst data transmission that may occur nearby in another cell that becomes co-channel interference in the cell of interest. There may be a small amount of data (e.g., an email or small data file) to convey in a bursty data transmission.

Figure 6:
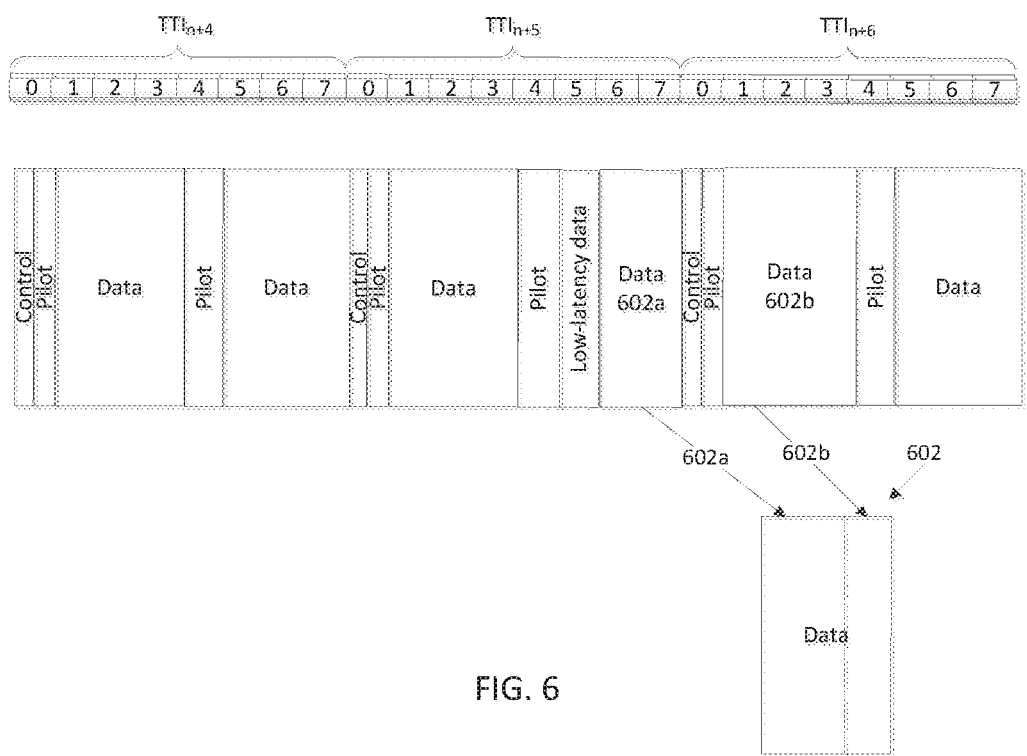
FIG. 6 illustrates an example frame structure to accommodate as needed transmission of low-latency data in association with a punctured data symbol in accordance with various aspects of the present disclosure.

Although the above example describes the puncturing of pilot and/or control symbols, it should also be understood that a data symbol may be punctured and accordingly shifted to a set of subsequent time slots in the current short TTI and/or to a set of time slots in the next short TTI. FIG. 6 illustrates an example frame structure to accommodate as needed transmission of low-latency data in association with a punctured data symbol. The structure illustrated in $TTI_{n+4}$ may be the TTI after $TTI_{n+3}$ illustrated in FIG. 4. In $TTI_{n+4}$, an OFDM symbol containing pilot and control symbols (labeled as "pilot" and "control") is transmitted at symbol index 0, an OFDM symbol containing data symbols (labeled as "data") is transmitted at symbol indexes 1-3 and 5-7, and an OFDM symbol containing a pilot symbol is transmitted at symbol index 4.

In $TTI_{n+5}$, low-latency data is available. The base station (e.g., base station 110a) may determine that low-latency data is available to transmit during a TTI (e.g., $TTI_{n+5}$). In the example illustrated in FIG. 6, data symbols are punctured. In some examples, based on the determination that low-latency data is available to transmit during $TTI_{n+5}$, the base station informs a mobile station (e.g., UE 120) that the low-latency data will be transmitted during a time slot (e.g., OFDM symbol period 5 in $TTI_{n+5}$) originally reserved for a data symbol 602 in $TTI_{n+5}$. Data or a data symbol may include a subset of one or more code blocks. For example, data symbol 602 includes a first subset of code blocks 602a and a second subset of code blocks 602b. The base station may shift the data symbol (and subsequent data symbols of the data to be transmitted during that TTI (e.g., $TTI_{n+5}$) such that the low-latency data is transmitted in one or more of the time slots reserved for the data symbol, and accordingly the data symbol is transmitted after the low-latency data.

The base station may transmit at least one code block included in data symbol 602 during a set of time slots in $TTI_{n+5}$. For example, set of code blocks 602 may be transmitted in one or more of the remaining available time slots in $TTI_{n+5}$. In an example, set of code blocks 602 "fits" within time slots 6 and 7 in $TTI_{n+5}$, and may be transmitted during time slots 6 and 7 in $TTI_{n+5}$. In this example, the base station may transmit all code blocks included in data symbol 602 during time slots 6 and 7 in $TTI_{n+5}$.

In another example, set of code blocks 602 does not "fit" within time slots 6 and 7 in $TTI_{n+5}$, and in particular may be too large to be transmitted within these two remaining time slots. For example, set of code blocks 602 may need to be transmitted during more than two time slots in order for the base station to transmit all of the code blocks included in data symbol 602. In some embodiments, the base station determines that the quantity of time slots to transmit data symbol 602 is greater than a remaining quantity of available time slots in current $TTI_{n+5}$. For example, the base station may determine that two available time slots remain in current $TTI_{n+5}$ and that transmission of code blocks 602a and 602b consumes three time slots.

In some embodiments, first set of code blocks 602a and second set of code blocks 602b are transmitted over different sub-bands (e.g., in a multiplexing context). Accordingly, only one set of the code blocks 602a/b may be punctured by the low-latency data being on the same sub-band. In an example, both sets of code blocks 602a and 602b may be transmitted during the next time slot. In another example, only the set of code blocks that was punctured is transmitted during the next time slot. In this example, the base station may send signaling/instructions to the UE to indicate that the set of code blocks received in the later time slot should be combined with the previously received set of code blocks to complete the data set.

If the base station determines that the quantity of time slots to transmit data symbol 602 is greater than a remaining quantity of available time slots in current $TTI_{n+5}$, the base station may inform the mobile station that a first subset of code blocks 602a included in data symbol 602 will be transmitted during a first set of time slots in current $TTI_{n+5}$ and that a second subset of code blocks 602b included in data symbol 602 will be transmitted during a second set of time slots in a subsequent TTI (e.g., $TTI_{n+6}$). In FIG. 6, the beginning time slot of a frame may include pilot and control data. For example, the base station may transmit one or more symbols (e.g., pilot and control symbols) during time slot 0 in $TTI_{n+6}$ and transmit second subset of code blocks 602b at the beginning of the time slot reserved for data symbols (e.g., during time slot 1 in $TTI_{n+6}$). The base station may transmit the pilot and control symbols before the data symbol so that the UE knows when and how the data symbols will be transmitted and how to decode the data symbol once received. The time slot including the pilot and control symbols precede the one or more time slots including second subset of code blocks 602b.

In the example illustrated in FIG. 6, first subset of code blocks 602a and second subset of code blocks 602b are transmitted during different TTIs. Additionally, second subset of code blocks 602b expands the entire data portion of $TTI_{n+6}$ in time slots 1-3. If code blocks included in a data symbol are shifted to the next TTI, the shifted code blocks may be aligned at the TTI level. The length of the code blocks may be longer to fit the entire data portion of the TTI with smaller resource allocation. Second subset of code blocks 602b may expand the entire data portion of the TTI along with new data. In an example, if no more data is to be transmitted during the TTI, padding may be applied. UE may combine set of code blocks 602A received during slots 6 and 7 of $TTI_{n+5}$ with set of code blocks 602B received during slots 1-3 of $TTI_{n+6}$ to process data symbol 602.

The UE may receive the indication that first subset of code blocks 602a included in data symbol 602 will be transmitted during a first set of time slots in a first TTI and an indication that second subset of code blocks 602*b* included in data symbol 602 will be transmitted during a second TTI. The second TTI may be the next TTI after the first TTI. In this example, the UE may receive first subset of code blocks 602*a* during the first set of time slots in the first TTI, receive one or more symbols (e.g., pilot and control symbols) during a first time slot in the second TTI, and receive second subset of code blocks 602*b* during the second set of time slots in the second TTI. The first time slot including the one or more symbols (e.g., pilot and control symbols) in the second TTI precedes the second set of time slots in the second TTI.

Figure 7:
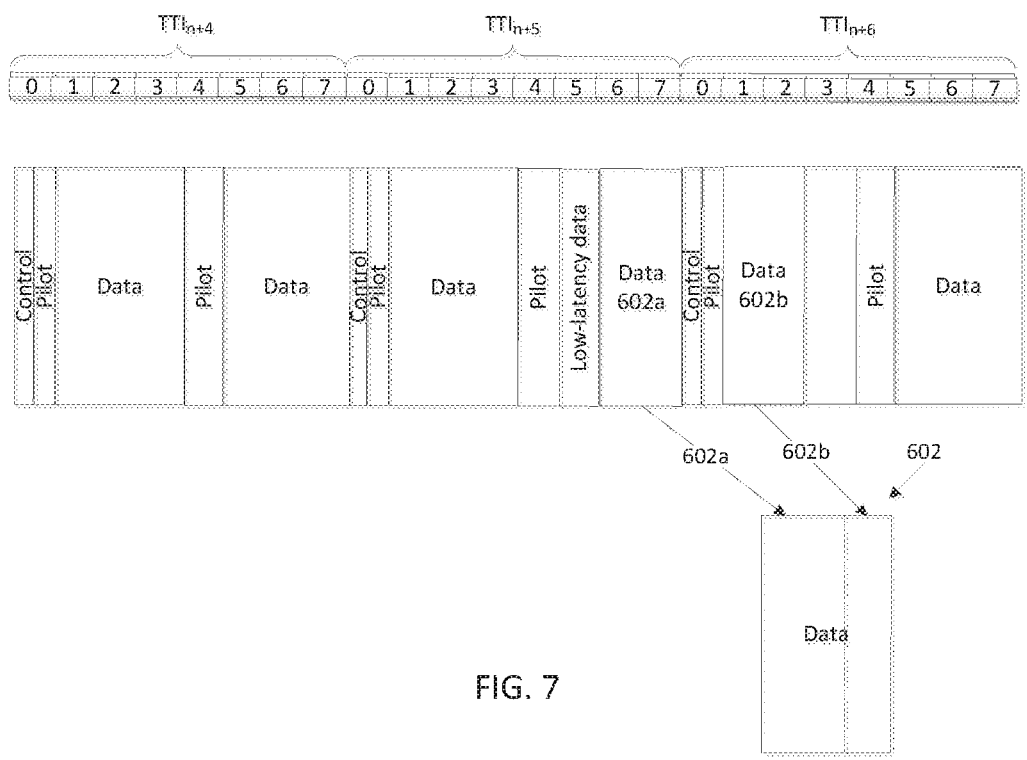
FIG. 7 illustrates another example frame structure to accommodate as needed transmission of low-latency data in association with a punctured data symbol in accordance with various aspects of the present disclosure.

FIG. 7 illustrates another example frame structure to accommodate as needed transmission of low-latency data in association with a punctured data symbol. In the example illustrated in FIG. 7, data symbol 602 is punctured. If no more data is to be transmitted during slot 3 of $TTI_{n+5}$, the amount of data transmitted may be reduced by not transmitting data during this time slot. For example, in FIG. 7, time slot 3 in $TTI_{n+6}$ may be empty (or filled with only pilot symbols) because all of the code blocks of data symbol 602 may have been transmitted to the UE.

Figure 8:
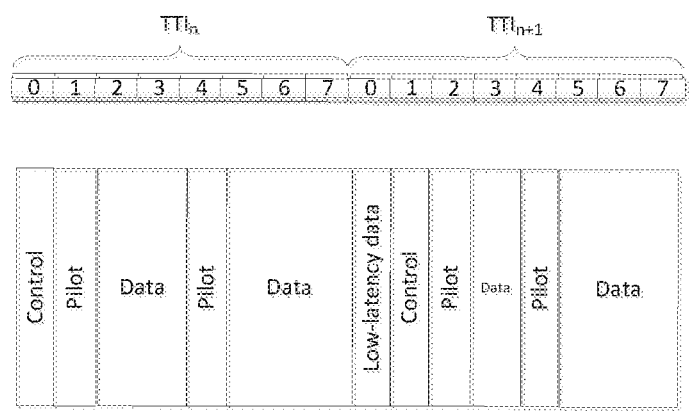
FIG. 8 illustrates an example frame structure to accommodate as needed transmission of low-latency data in association with a punctured control symbol in accordance with various aspects of the present disclosure.

FIG. 8 illustrates an example frame structure to accommodate as needed transmission of low-latency data in association with a punctured control symbol. In FIG. 8, in $TTI_n$, an OFDM symbol containing a control symbol is transmitted at symbol index 0, an OFDM symbol containing a pilot (for data) symbol is transmitted at symbol index 1, data symbols are transmitted at OFDM symbol indexes 2 and 3, an OFDM symbol containing a pilot symbol is transmitted at symbol index 4, and an OFDM symbol containing a data symbol is transmitted at symbol indexes 5-7. In $TTI_{n+1}$, low-latency data is available. In the example illustrated in FIG. 8, the punctured data includes a control symbol. The low-latency data supersedes the control data for $TTI_{n+1}$ in FIG. 8 and is transmitted in slot 0 in $TTI_{n+1}$, at the slot originally intended for the control symbol. The control symbol can be moved from OFDM symbol period 0 to OFDM period 1 to make room for the low-latency data, and the pilot symbol can be moved from OFDM symbol period 1 to OFDM period 2 to make room for the punctured control symbol. The data symbol can be transmitted in slot 3 in $TTI_{n+1}$.

Figure 9:
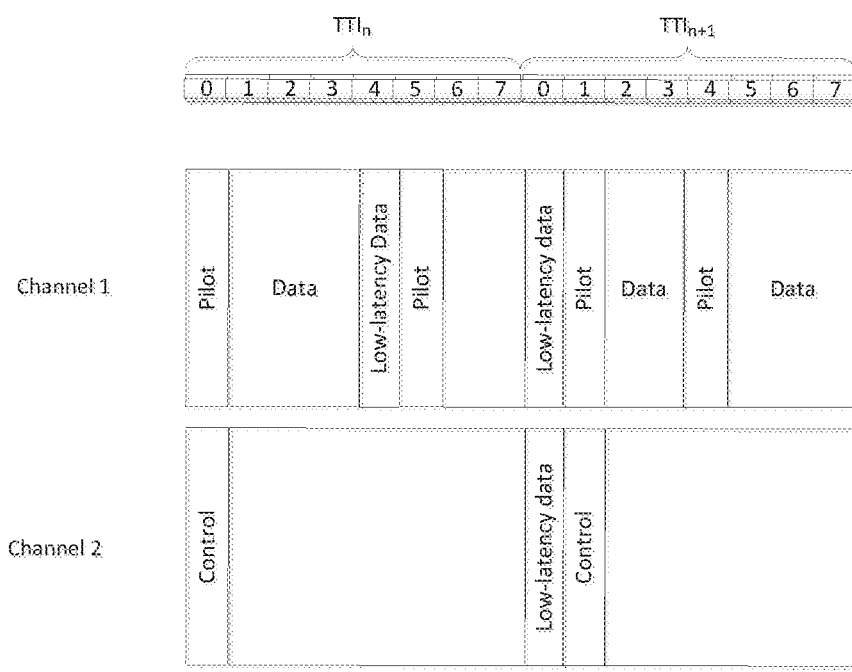
FIG. 9 illustrates an example frame structure to accommodate as needed transmission of low-latency data in association with a punctured pilot or control symbol.

In other instances, the control symbol and pilot symbol are transmitted during the same symbol period such that both the control symbol and pilot symbol are moved from a scheduled OFDM symbol period (e.g., OFDM symbol period 0) to a subsequent OFDM symbol period (e.g., OFDM symbol period 1) following transmission of the low-latency data. FIG. 9 illustrates an example frame structure to accommodate as needed transmission of low-latency data in association with a punctured pilot or control symbol. Pilot (for data) and control symbols may be transmitted during the same period but using different channels (e.g., different frequency bands). For example, as illustrated in FIG. 9, pilot symbols may be transmitted on channel 1 and control symbols may be transmitted on channel 2. In some examples, low-latency data may be transmitted over only one of the channels such that the low-latency data punctures one of the symbols but not the other. For example, low-latency data may puncture only the pilot symbol on channel 1 but not the control symbol on channel 2. Alternatively, low-latency data may puncture only the control symbol on channel 2 but not the pilot symbol on channel 1. In other instances, the low-latency data may be transmitted over both channels such that the pilot symbol and control symbol are punctured.

In FIG. 9, in $TTI_n$, an OFDM symbol containing a control symbol is transmitted at symbol index 0 on channel 2, an OFDM symbol containing a pilot symbol is transmitted at symbol index 0 on channel 1, and an OFDM symbol containing a data symbol is transmitted at symbol indexes 1-3 on channel 2. The next pilot symbol scheduled for symbol index 4 on channel 1 may be punctured by low-latency data. A pilot symbol may be punctured and moved over from its original symbol index 4 on channel 1 to symbol index 5 on channel 1 to make room for the low-latency data. The low-latency data is transmitted at symbol index 4 on channel 1, and the pilot symbol is transmitted at symbol index 5 on channel 1.

In FIG. 9, low-latency data is available for transmission in $TTI_{n+1}$. In the example illustrated in FIG. 9, the pilot and control symbols that are scheduled to be transmitted at symbol index 0 on channels 1 and 2 are punctured. Accordingly, the low-latency data is transmitted at symbol index 0 over both channels 1 and 2. The pilot and control symbols can be moved from symbol period 0 to symbol period 1 to make room for the low-latency data.

Figure 10:
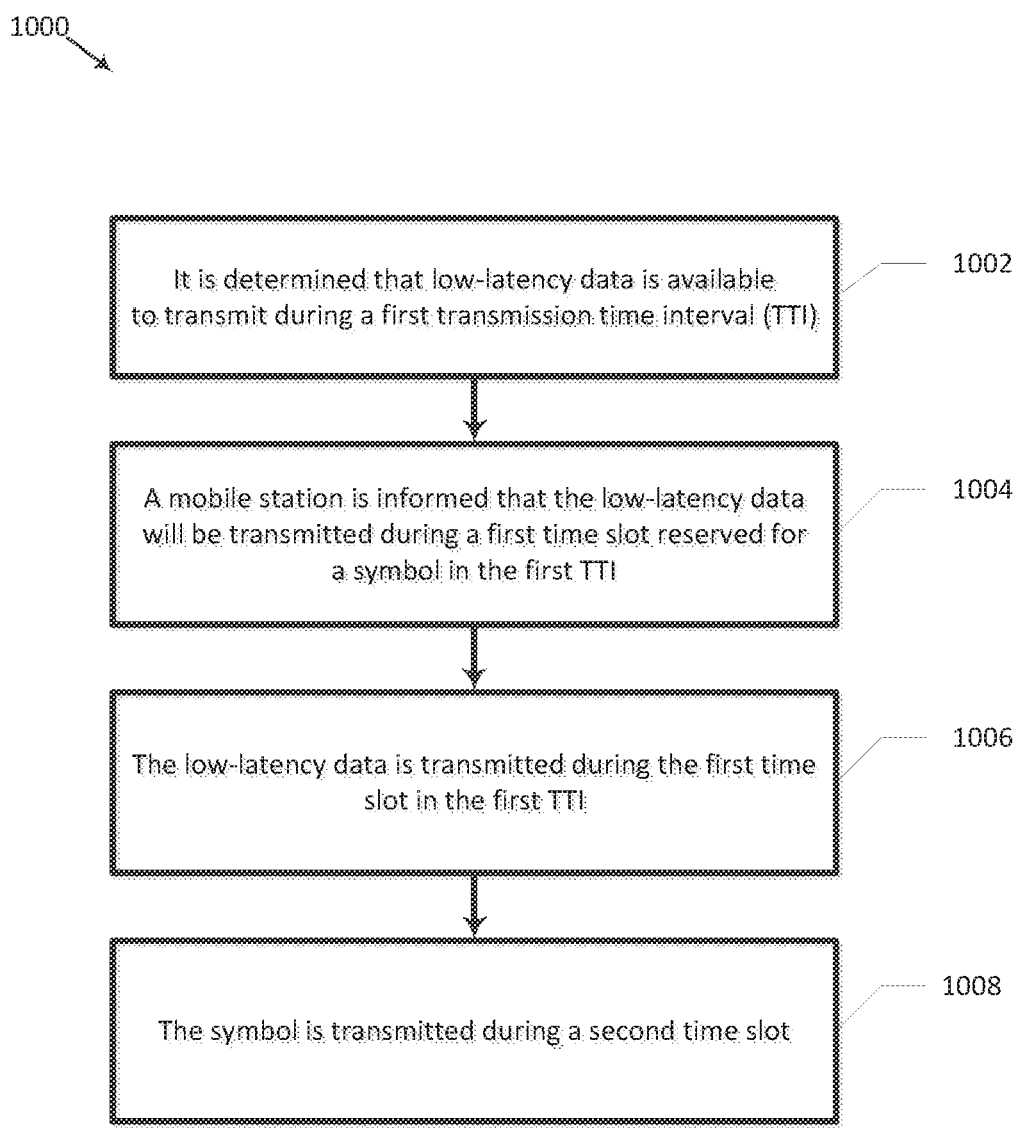
FIG. 10 is a flowchart illustrating an exemplary method for adapting structures in accordance with various aspects of the present disclosure.

FIG. 10 is a flowchart illustrating an exemplary method 1000 for adapting structures (e.g., pilot structures, control structures, and/or data structures). The method 1000 may be implemented in a base station, such as base station 110. The base station communicates with a UE, such as UE 120, according to method 1000. The method may be implemented in transmitter system 210. Instructions or code may be stored in the memory 232 that are executable by the processor 230 in transmitter system 210 to implement the method 1000. It should be understood that method 1000 is not meant to be limiting and may be used in other applications.

The method begins in a block 1002. In block 1002, it is determined that low-latency data is available to transmit during a first TTI. In a block 1004, a mobile station is informed that the low-latency data will be transmitted during a first time slot reserved for a symbol in the first TTI. The symbol may be, for example, a pilot symbol, control symbol, or data symbol. In a block 1006, the low-latency data is transmitted during the first time slot in the first TTI. In a block 1008, the symbol is transmitted during a second time slot.

It is understood that additional actions may be performed before, during, or after blocks 1002, 1004, 1006, and 1008 as discussed above. It is also understood that one or more of the blocks of method 1000 described herein may be omitted, combined, or performed in a different sequence as desired.

Figure 11:
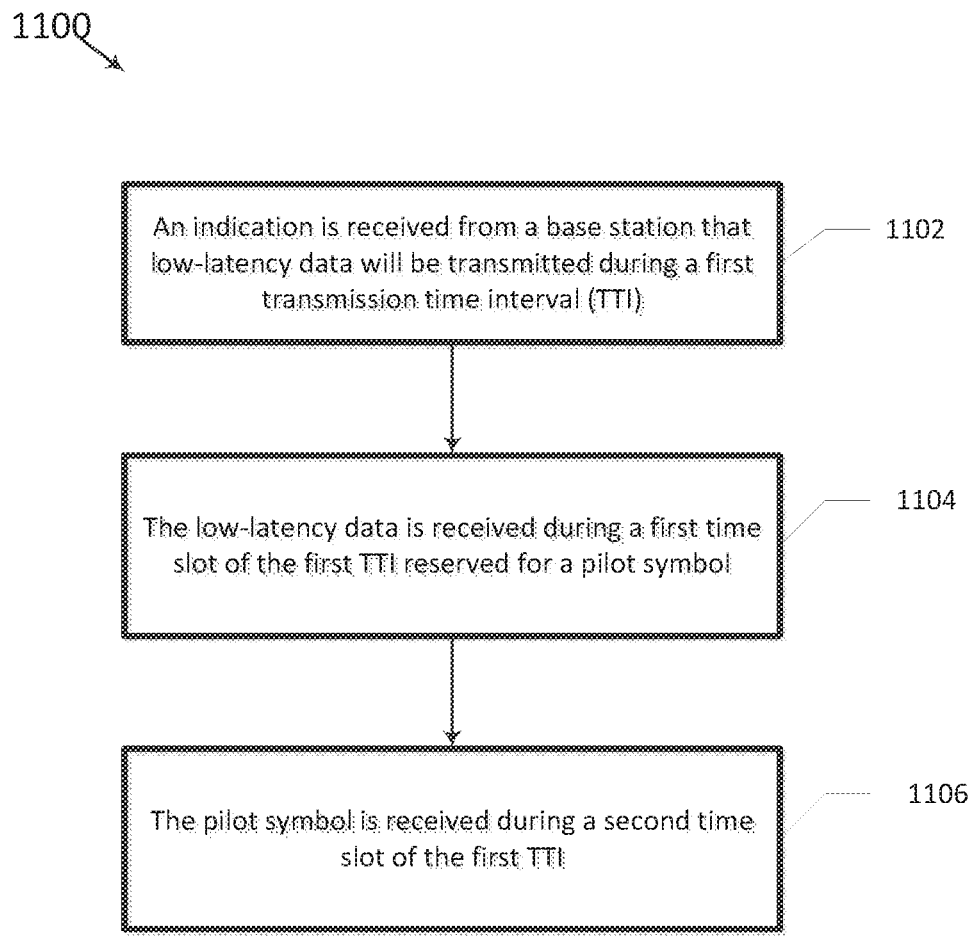
FIG. 11 is a flowchart illustrating an exemplary method for adapting structures in accordance with various aspects of the present disclosure.

FIG. 11 is a flowchart illustrating an exemplary method 1100 for adapting structures (e.g., pilot structures, control structures, and/or data structures). The method 1100 may be implemented in a UE, such as UE 120. A UE communicates with a base station, such as base station 110, according to the method 1100. The method may be implemented in the receiver system 250. Instructions or code may be stored in the memory 272 that are executable by the processor 270 in the receiver system 250 to implement the method 1100. It should be understood that method 1100 is not meant to be limiting and may be used in other applications.

The method 1100 begins in a block 1102. In block 1102, an indication is received from a base station that low-latency data will be transmitted during a first TTI. In a block 1104, the low-latency data is received during a first time slot of the first TTI reserved for a symbol. The symbol may be, for example, a pilot symbol, control symbol, or data symbol. In a block 1106, the symbol is received during a second time slot of the first TTI.

It is understood that additional actions may be performed before, during, or after blocks 1102, 1104, and 1106 as discussed above. It is also understood that one or more of the blocks of method 1100 described herein may be omitted, combined, or performed in a different sequence as desired.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication, the method comprising:
    determining, at a first wireless communication device, that low-latency data is available;
    transmitting, from the first wireless communication device, the low-latency data during a first symbol period of a first transmission time interval (TTI) by puncturing, in response to determining that the low-latency data is available, at least one of a pilot symbol or a control symbol scheduled to be transmitted during the first symbol period for an on-going data communication, the puncturing based on the on-going data communication being more delay tolerant compared to the low-latency data;
    transmitting, from the first wireless communication device, an indication that the low-latency data is to be transmitted during the first symbol period based on the at least one of the punctured pilot symbol or the punctured control symbol; and
    transmitting, from the first wireless communication device, the at least one pilot symbol or control symbol for the on-going data communication during a second symbol period of the first TTI instead of the first symbol period scheduled for the at least one pilot symbol or control symbol based on the low-latency data, wherein a data symbol of the on-going data communication is scheduled to be transmitted during the second symbol period.

2. The method of claim 1, further comprising:
    delaying transmission of the at least one pilot symbol or control symbol from the first symbol period to the second symbol period.

3. The method of claim 1, wherein the transmitting the indication comprises:
    transmitting the indication further including information that the at least one pilot symbol or control symbol will be transmitted during the second symbol period.

4. The method of claim 1, further comprising:
    determining that the low-latency data is to be transmitted during the first symbol period instead of the at least one control symbol or a pilot symbol.

5. The method of claim 1, further comprising:
    transmitting the data symbol including one or more code blocks.

6. The method of claim 5, wherein transmitting the data symbol includes transmitting the data symbol during the second symbol period of the first TTI.

7. The method of claim 5, further comprising:
    transmitting information that a first subset of the one or more code blocks will be transmitted during the second symbol period of the first TTI; and
    transmitting the first subset of the one or more code blocks during the second symbol period of the first TTI.

8. The method of claim 7, further comprising:
    transmitting information that a second subset of the one or more code blocks will be transmitted during a subsequent symbol period; and
    transmitting the second subset of the one or more code blocks during the subsequent symbol period.

9. The method of claim 8, wherein the subsequent symbol period is in the first TTI.

10. The method of claim 8, wherein the subsequent symbol period is in a second TTI.

11. A method of wireless communication, the method comprising:
    determining, at a first wireless communication device, that low-latency data is available for transmission during a first transmission time interval (TTI);
    transmitting, from the first wireless communication device, the low-latency data during a first symbol period of the first TTI by puncturing, in response to determining that the low-latency data is available, at least one of a pilot symbol or a control symbol scheduled to be transmitted during the first symbol period, for an on-going data communication, the puncturing based on the on-going data communication being more delay tolerant compared to the low-latency data;

identifying, at the first wireless communication device, a second symbol period for transmission of the at least one pilot symbol or control symbol for the on-going data communication instead of the first symbol period scheduled for the at least one pilot symbol or control symbol based on the low-latency data, wherein a data symbol of the on-going data communication is scheduled for transmission during the second symbol period; and transmitting, from the first wireless communication device, a notification message that the at least one pilot symbol or control symbol will be transmitted during the second symbol period and the low-latency data is to be transmitted during the first symbol period based on the at least one of the punctured pilot symbol or the punctured control symbol.

12. The method of claim 11, wherein identifying the second symbol period includes identifying the second symbol period in the first TTI.

13. The method of claim 11, wherein identifying the second symbol period includes identifying the second symbol period in a second TTI.

14. The method of claim 11, wherein transmitting the notification message includes transmitting the notification message over a control channel.

15. The method of claim 11, further comprising:
transmitting the at least one pilot symbol or control symbol during the second symbol period.

16. The method of claim 15, wherein transmitting the at least one pilot symbol or control symbol includes transmitting the at least one pilot symbol or control symbols during the second symbol period instead of a data symbol that is scheduled to be transmitted during the second symbol period.

17. The method of claim 15, wherein transmitting the at least one pilot symbol or control symbol during the second symbol period includes delaying transmission of the at least one pilot symbol or control from the first symbol period to the second symbol period.

18. The method of claim 11, wherein transmitting the notification message includes transmitting the notification message including a number of symbol periods, between the first symbol period and the second symbol period, for which transmission of the at least one pilot symbol or control symbol is delayed.

19. The method of claim 11, wherein
transmitting the low-latency data includes transmitting the low-latency data over a data channel; and
transmitting the notification message includes transmitting the notification message over a control channel.

20. The method of claim 19, further comprising:
determining that the low-latency data is to be transmitted during the first symbol period instead of the at least one control symbol or a pilot symbol that is scheduled to be transmitted during the first symbol period.

21. A method for wireless communication, the method comprising:
determining, at a first wireless communication device, that low-latency data is available for transmission;
transmitting, from the first wireless communication device, the low-latency data during a first symbol period of a first transmission time interval (TTI) by puncturing, in response to determining that the low-latency data is available, at least one of a pilot symbol or a control symbol scheduled to be transmitted during the first symbol period, for an on-going data communication, the puncturing based on the on-going data communication being more delay tolerant compared to the low-latency data;

transmitting, from the first wireless communication device, an indication that the low-latency data is to be transmitted during the first symbol period based on the at the at least one of the punctured pilot symbol or the punctured control symbol;

transmitting, from the first wireless communication device, the at least one pilot symbol or control symbol being utilized in the on-going data communication during a second symbol period of the first TTI instead of the first symbol period scheduled for the at least one pilot symbol or control symbol based on the low-latency data, wherein a data symbol of the on-going data communication having one or more code blocks is scheduled to be transmitted during the second symbol period;

transmitting, from the first wireless communication device, a first subset of the one or more code blocks of the data symbol during a second symbol period in the first TTI; and transmitting, from the first wireless communication device, a second subset of the one or more code blocks of the data symbol during a symbol period subsequent to the second symbol period of the first TTI.

22. The method of claim 21, further comprising:
transmitting a first notification message that the first subset of the one or more code blocks will be transmitted during the second symbol period of the first TTI; and
transmitting a second notification message that the second subset of the one or more code blocks will be transmitted during the subsequent symbol period.

23. The method of claim 22, wherein the subsequent symbol period is in the first TTI.

24. The method of claim 22, wherein the subsequent symbol period is in a second TTI.

25. The method of claim 24, further comprising:
transmitting a control symbol and/or a pilot symbol during a first symbol period in the second TTI, the first symbol period in the second TTI preceding the subsequent symbol period in the second TTI.

26. The method of claim 22, wherein transmitting the first notification message includes transmitting the first notification message including a number of symbol periods, between the first symbol period and the second symbol period, for which transmission of the first subset of the one or more code blocks is delayed.

27. A wireless communication device, comprising:
a transmitter;
an electronic memory; and
a processor coupled to the transmitter and to the electronic memory, the processor configured to:
determine that low-latency data is available for transmission;
transmit the low-latency data during a first symbol period of a first transmission time interval (TTI) by puncturing, in response to determining that the low-latency data is available, a pilot symbol and/or a control symbol scheduled to be transmitted during the first symbol period, for an on-going data communication, the puncturing based on the ongoing data communication being more delay tolerant compared to the low-latency data;
transmit an indication that the low-latency data is to be transmitted during the first symbol period based on the at the at least one of the punctured pilot symbol or the punctured control symbol; and transmit the pilot symbol and/or control symbol for the on-going data communication during a second symbol period of the first TTI instead of the first symbol period scheduled for the pilot symbol and/or control symbol based on the low-latency data, wherein a data symbol of the on-going data communication is scheduled to be transmitted during the second symbol period.

28. The device of claim 27, wherein the processor is configured to transmit a notification message to another wireless communication device over a control channel, the notification message informing the another wireless communication device that the pilot symbol and/or control symbol will be transmitted during the second symbol period.

29. The device of claim 28, wherein the notification message includes a number of symbol periods, between the first symbol period and the second symbol period, for which transmission of the pilot symbol and/or control symbol is delayed.

30. The device of claim 27, wherein the processor is configured to delay transmission of the pilot symbol and/or control symbol from the first symbol period to the second symbol period.

* * * * *